United States Patent [19]
Van Lierde

[11] 3,940,312
[45] Feb. 24, 1976

[54] NUCLEAR FUEL AND PROCESS OF PREPARATION THEREOF

[75] Inventor: Walter Jan Van Lierde, Mechelen, Belgium

[73] Assignee: Studiecentrum Voor Kernenergie, "S.C.K.", Brussels, Belgium

[22] Filed: July 20, 1972

[21] Appl. No.: 273,368

[30] Foreign Application Priority Data
July 26, 1971  Belgium .............................. 770488

[52] U.S. Cl. ........ 176/67; 176/91 SP; 252/301.1 R; 264/.5
[51] Int. Cl. ............................................. G21c 3/06
[58] Field of Search ................ 252/301.1 R; 264/.5; 176/91 SP, 67

[56] References Cited
UNITED STATES PATENTS

| 3,332,883 | 7/1967 | Norregs...................... 252/301.1 R |
| 3,376,231 | 4/1968 | Beucherie et al..................... 264/.5 |
| 3,418,245 | 12/1968 | Hazelden et al. ............. 252/301.1 R |
| 3,536,793 | 10/1970 | Norman et al.......................... 264/.5 |
| 3,669,832 | 6/1972 | Boettcher......................... 176/91 SP |
| 3,708,433 | 1/1973 | Leitnaker et al............. 252/301.1 R |
| 3,723,581 | 3/1973 | Boettcher ................................ 26/.5 |

OTHER PUBLICATIONS

Spear et al., *Phase Behavior of U–V–C Systems . . . Crystal Structure of* $UVC_2$, Sept, 1970, Nuclear Science Abstracts, No. 34967.
Patriarcu et al., *Development of High Performance LMFBR Fuels*, Feb. 1970, Nuclear Science Abstracts, No. 4827.

*Primary Examiner*—Benjamin A. Borchelt
*Assistant Examiner*—C. T. Jordan
*Attorney, Agent, or Firm*—Stevens, Davis, Miller & Mosher

[57] ABSTRACT

Vanadium carbide is present in the particles as supersaturated solid solution and the particles are coated with a thin porous layer of vanadium carbide.

3 Claims, 1 Drawing Figure

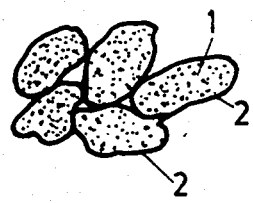

NUCLEAR FUEL AND PROCESS OF PREPARATION THEREOF

The invention relates to nuclear fuel comprised of particles of fuel carbide in which vanadium carbide is dissolved.

By fuel carbide is meant within the scope of the invention, any carbide which may be used as fuel in a nuclear reactor. Said fuel carbide will thus mostly be uranium carbide or uranium-plutonium carbide.

The use of carbide as fuel for nuclear reactors comes up against two main difficulties.

There should first be taken into account the problem of joinability of the fuel carbide and of the stainless steel used as case material. When carbon migrates from the carbide to the case material, the mechanical properties of the steel deteriorate, which may cause a breaking of the case.

The fuel carbide has moreover the property to swell strongly during the irradiating. Such swelling is caused by gaseous fission products which are insoluble in the carbide and which collect mostly on the boundaries of the grain-like particles, in the shape of gas bubbles. Due to the growing of such gas bubbles there occurs an undesirable volume increase.

It is already known to obviate the chemical incompatibility between the fuel carbide and the case material, to add small amounts of metals or metal carbides, for example vanadium carbide. Due to such an addition, the chemical carbon potential is stabilized to a level where carbon migration to the case becomes thermodynamically impossible.

To the contrary the problem of swelling of the fuel due to the formation of gaseous fission products during irradiating has not yet been solved. To oppose the fuel swelling, empty space has already been provided both between the case and the carbide and inside the carbide itself, as a porosity. This arrangement is but partly successful and causes further disadvantages.

It has also already been proposed to precipitate finely-divided tungsten during the irradiating, because the elementary gas bubbles would be retained on the precipitate, in such a way that they will not coalesce and thus swelling of the aggregate will not take place. This measure also is not completely successful.

The invention now provides a successful and economical solution, both to the fuel carbide swelling and to the incompatibility between said fuel and the stainless steel of the case material, without bringing substantial new disadvantages.

For this purpose vanadium carbide is present in the particules as supersaturated solid solution and the particles are coated with a thin porous layer of vanadium carbide.

It is also very important that the particles be monocrystalline.

In an advantageous embodiment, the thin layer of vanadium carbide is comprised of vanadium monocarbide and vanadium hemicarbide.

Preferably the density of the thin layer is low.

In a particular embodiment of the invention, the thin layer has a density of about 65 percent of the theoretical density.

The invention does not only relate to the above-described fuel, but also to a method for preparing a nuclear fuel.

According to the invention, the method comprises preparing a supersaturated solid solution of vanadium carbide in fuel carbide, comminuting the material thus obtained down to a maximum size of the resulting grains of about 400 $\mu$, sieving out the particles with a maximum size lying between 20 and 400 $\mu$, coating the resulting particles with a thin layer of vanadium carbide having a maximum thickness of 10 $\mu$, and pressing together the coated particles.

The particles pressed in a mold are preferably sintered.

In an advantageous embodiment, the particles are coated with a thin layer of vanadium monocarbide and vanadium hemicarbide.

In an useful embodiment, the supersaturated solid solution is prepared with approximately 1.5 atoms % vanadium carbide.

In a preferred embodiment, to prepare the supersaturated solid solution, the fuel carbide is molten with the vanadium carbide, the resulting product is left to solidify, the product is annealed and it is very rapidly cooled.

In a very particular embodiment, the particles are coated with a thin layer of vanadium monocarbide-vanadium hemicarbide with a maximum thickness of 10 $\mu$ by slightly moistening the particles and then bringing same in a mixer together with powder-like vanadium monocarbide-vanadium hemicarbide.

Other details and features of the invention will stand out from the description given below by way of non limitative example and with reference to the accompanying drawing which shows a cross-section through nuclear fuel according to the invention.

Uranium carbide with 1.5 atoms % vanadium monocarbide is melted in the flame arc until an homogeneous molten carbide mixture is obtained. The molten mass is then left to solidify, which occurs at a temperature of about 2500°C. The product is then annealed by maintaining the solidified mass at a temperature of about 2000°C during approximately one hour.

1.5 atoms % vanadium carbide have thus been introduced as solution in the uranium carbide.

As the vanadium carbide should remain in solution, the annealed mass is cooled very rapidly to room temperature. The cooling is performed for example in a matter of a few minutes.

The resulting mass is comminuted in a ball mill until the maximum size of the broken parts is about 400 $\mu$.

The useful fractions are sieved out from the resulting powder. By useful fractions is meant here particles with a maximum size between 20 and 400 $\mu$.

Said particles are slightly moistened with liquid paraffin and brought in a mixer together with a very fine powder-like mixture of vanadium monocarbide and vanadium hemicarbide. The mean cross-section of the powdered mixture grains is not critical but lies for example around 0.06 $\mu$.

The weight ratio between the vanadium monocarbide amount and the vanadium hemicarbide amount is not critical but lies for example about 1:1.

The density of the thin layer should be kept low. A density of for example about 65 percent of the theoretical density may be considered as desirable. As the density of VC is 5.65 g/cc and the density of $V_2C$ is 5.66 g/cc, it is desirable to obtain a density of about 3.67 g/cc for the thin layer.

The coated particles are pressed in the shape of a rod or a pellet. The resulting rod or pellet is brought to the sintering temperature. Said sintering temperature does not lie above 1400°C.

The fuel has thus taken the shape of monocrystalline particles of uranium carbide in which vanadium monocarbide is present as supersaturated solid solution. The monocrystalline particles 1 are surrounded by a layer 2 which is comprised of a mixture of vanadium hemicarbide and vanadium monocarbide. Said layer is porous and becomes slightly plastic by the high temperatures which are reached in the nuclear reactor.

During the irradiation, the vanadium carbide precipitates out of the uranium carbide wherein it is present as supersaturated solid solution. The precipitated vanadium carbide forms a collector for the gaseous fission fragments. Due to the particles of uranium carbide which contain vanadium carbide being monocrystalline, said particles comprise no grain boundaries. This already avoids swelling. When the precipitates from the vanadium carbide in the particles 1 may not completely prevent swelling, said particles will show a slight swelling. The layer 2 comprised of vanadium monocarbide and vanadium hemicarbide will however neutralize said swelling by plastic distortion.

The thin layers 2 around the particles form a network of channels along which the formed gaseous fission fragments may escape. The gaseous fission fragments thus leave the fuel.

There results from the above that the chemical stabilizing is obtained through the addition of vanadium carbide to the fuel carbide.

The stabilizing against swelling results from the fuel being present as monocrystalline particles, from the fuel being prepared as supersaturated solid solution from which precipitates are formed during the irradiation and from the monocrystalline particle being surrounded by a thin porous layer of vanadium carbide which acts as mechanical buffering layer by plastic distortion and as network for releasing the fission gases. Both the dispersoid structure (the vanadium carbide as supersaturated solution in the uranium carbide) and the cell structure (the thin layers of vanadium carbide around the uranium carbide particles) are very important.

The invention is in no way limited to the above embodiments and many changes may be brought therein without departing from the scope of the invention as defined by the appended claims.

While uranium carbide has been mentioned in the above example, the fuel carbide may also be comprised of uranium-plutonium carbide. The carbide which is introduced as supersaturated solid solution in the fuel carbide particles may be comprised of a mixture of vanadium monocarbide and vanadium hemicarbide.

The layer thickness, the layer density and the various dimensions may substantially differ from the above-mentioned values.

I claim:

1. A nuclear fuel comprising monocrystalline particles with a maximum size lying between 20 $\mu$ and 400 $\mu$, of carbide of uranium or uranium-plutonium with vanadium carbide in supersaturated solution, and coated with a layer of vanadium carbide with a maximum thickness of 10 $\mu$.

2. A nuclear fuel as claimed in claim 1, in which the coating is comprised of VC and $V_2C$.

3. A nuclear fuel as claimed in claim 1, in which the coating has a density of about 3.67 g/cc.

* * * * *